April 23, 1968   R. V. HARRIS ET AL   3,379,902

ULTRASONIC TESTING APPARATUS

Filed Dec. 30, 1965

INVENTORS.
ROBERT V. HARRIS
HENRY G. BIAGINI
BY
Ervin B. Steinberg
Agent

United States Patent Office 3,379,902
Patented Apr. 23, 1968

3,379,902
ULTRASONIC TESTING APPARATUS
Robert V. Harris, Darien, and Henry G. Biagini, Stamford, Conn., assignors to Branson Instruments, Inc., Stamford, Conn., a corporation of Delaware
Filed Dec. 30, 1965, Ser. No. 517,547
5 Claims. (Cl. 310—8.5)

ABSTRACT OF THE DISCLOSURE

A solid coupling means made of polymeric plastic material is interposed between an electro-acoustic transducer and a workpiece and is adapted to provide a focused beam of ultrasonic energy to the workpiece. The coupling means has a notch for receiving therein the transducer, a cylindrical or spherical reflecting surface for reflecting the acoustic energy, and a further surface at which the reflected ultrasonic energy, brought substantially to a focused beam, leaves the coupling means and enters a workpiece to be tested.

---

This invention relates to nondestructive testing of materials. More specifically, this invention concerns a new and improved probe for nondestructively testing an object by means of acoustic waves.

Nondestructive testing methods and apparatus have received wide acceptance in industry. One of the most useful methods for the nondestructive testing of objects lies in the field of ultrasonics wherein acoustic waves above the audible range are utilized for testing objects for surface and internal flaws and defects.

The conventional procedure is to utilize an electromechanical transducer, generally in the form of a piezoelectric crystal, which generates the ultrasonic waves and transmits the same into the object under test. A receiving transducer responsive to the acoustic waves which pass through the material or which are reflected from the discontinuity or flaw is used to sense of the presence of a defect within the area of the ultrasonic beam. The receiving transducer may be either the same transducer as the transmitting transducer, or a separate transducer.

When testing relatively thin materials or when a flaw or discontinuity is expected in close proximity to the entrant surface of the object, it is necessary to provide a coupling means between the transducer and the object under test in order to obtain a sufficient time delay between the initial pulse, also known as the main bang, and a subsequent echo signal. Such coupling means generally take the form of a solid coupler or a liquid coupling medium, typically a column of water. This method is described in U.S. Patent No. 2,467,301 issued to F. A. Firestone, dated Apr. 12, 1949, entitled, "Supersonic Inspection for Flaws Lying Near the Surface of a Part."

The present invention concerns a solid coupling medium which is particularly suited for testing thin sections of material, such as thin-wall pipes where the coupling means not only provides a convenient method for coupling a piezoelectric transducer to a workpiece under test but is used also to shape the beam to produce a focused beam at the entrant surface of the workpiece. In this manner, the coupling means is adapted for testing small and relatively thin objects with a high degree of precision.

Quite specifically, the coupling means described hereafter is suited for testing thin-walled pipes by the acoustic resonance method which uses frequencies in the order of 30 megacycles per second, the piezoelectric crystal at these frequencies being relatively small and flimsy, yet must be mounted so as to provide ultrasonic energy to the workpiece in a reliable manner.

One of the principal objects of this invention is, therefore, the provision of a new and improved coupling means for acoustic energy.

Another important object of this invention is the provision of a solid coupling means which is adapted to receive a piezoelectric transducer and provide a focused beam of acoustic energy to a workpiece.

A further object of this invention is the provision of a solid acoustic delay means adapted to be coupled between a piezoelectric transducer and a workpiece, the delay means having a reflecting surface adapted to focus acoustic energy for providing a beam of focused energy to a location in proximity to the exit surface of the delay means and to the entrant surface of the workpiece under test.

A still further object of this invention is the provision of a solid coupling means made of synthetic organic material which is interposed between a piezoelectric transducer and a workpiece under test, such coupling means having a surface for receiving the piezoelectric transducer, a surface for reflecting the acoustic energy propagated by the piezoelectric transducer and a further surface at which the acoustic energy leaves the coupling means, whereby the surfaces are shaped so as to provide a focused beam of acoustic energy to a workpiece which is in contact with the exit surface of the coupling means.

Further and still other objects of this invention will be more clearly apparent by reference to the following description when taken in conjunction with the accompanying figures in which.

Figure 1:
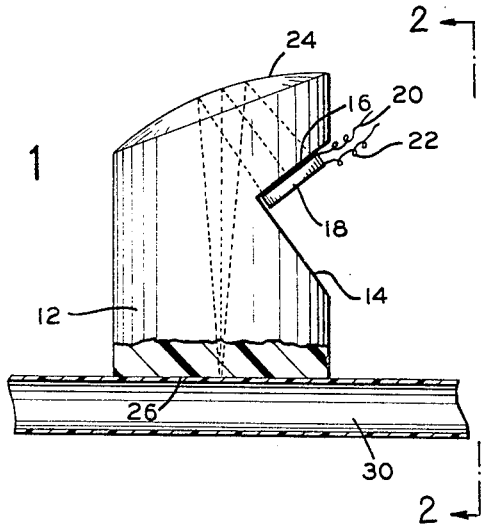
FIGURE 1 is an elevational view of the coupling means in accordance with the present invention.
Figure 2:
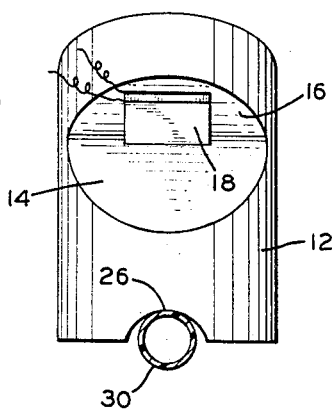
FIGURE 2 is a view along lines 2—2 in FIGURE 1.
Figure 3:
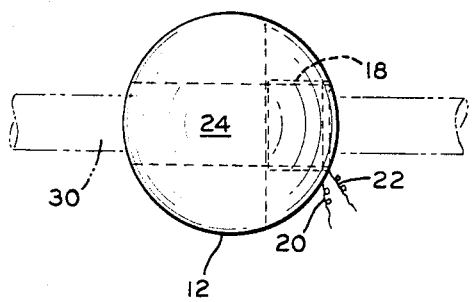
FIGURE 3 is a top view of FIGURE 1.

Referring now to the figures numeral 12 identifies a solid piece of polymeric plastic material, typically polystyrene, which is provided in its side with a notch formed by the inclined surfaces 14 and 16. A small piezoelectric transducer 18 is mounted to one surface 16 by means of epoxy resin. The piezoelectric transducer receives electric energy via the conductors 20 and 22 which are attached to the opposite sides of the transducer. The transducer is typically a piece of lithium sulfate.

Upon energizing the piezoelectric transducer 18 with signals of suitable frequency, typically 30 megacycles per second, a beam of acoustic energy is propagated within the coupling means 12 toward the curved surface 24 which is exposed to air. Therefore, as is well known, the surface 24 acts as a reflecting surface and by being suitably inclined reflects the beam of acoustic energy toward the opposite exit surface 26 which is in contact with a workpiece to be tested, such as a thin-walled tubing 30. In order to transmit the energy into the workpiece 30 a suitable couplant, such as water, glycerine or silicone grease, is interposed between the exit surface 26 of the coupling means 12 and the entrant surface of the workpiece 30.

For detecting tiny surface flaws or impurities within the workpiece 30, it is desired that a sharp or focused beam of acoustic energy be available at the entrant surface of the workpiece 30. To this end, the reflecting surface 24 is shaped to provide a focused beam at the surface 26, or as close in proximity thereto, as may be achieved by conventional manufacturing techniques. When shaping the surface 24 so that it forms a part of a cylinder, the acoustic energy is focused in one plane, thereby providing fairly accurate results. Still better results are achieved by shaping the surface 24 in the form of a sphere, causing the beam of acoustic energy to come to a sharp focal point at the entrant surface of the workpiece 30.

The arrangement described hereinabove has been found particularly useful in connection with the gauging and testing of thin-walled material by means of the well known resonance method wherein the frequency of the acoustic energy is adjusted to provide standing waves in the workpiece. This testing technique together with an intermediate coupling means is described for instance in U.S. Patent No. 3,148,536 issued to R. V. Harris, dated Sept. 15, 1964, entitled "Ultrasonic Thickness Gage." The longitudinal groove provided in the coupling means aids in locating a tubular workpiece of the type illustrated.

It may be noted that by virtue of the design described hereinabove a folded path for the acoustic beams is provided, the beams forming an acute angle. This construction reduces the overall length of the coupling means and provides for an extremely compact and convenient arrangement. Also, the transducer crystal is well protected during manipulation and storage within the recess of the coupling means.

While there has been described and illustrated a specific embodiment of the present invention, it will be apparent to those skilled in the art that certain changes and modifications may be made without affecting the broad principle and intent of this invention, which shall be limited only by the scope of the appended claims.

What is claimed is:

1. A solid coupling means adapted to be interposed between an electroacoustic transducer and the entrant surface of an object which is to be explored by acoustic energy, said coupling means comprising:

a piece of solid polymeric plastic material;

a notch disposed within said material for receiving on a surface thereof an electroacoustic transducer which when energized with electric energy produces a beam of acoustic energy;

a curved reflecting surface disposed relative to said transducer and notch for receiving said beam of energy and reflecting it toward a further surface of said material, said further surface being adapted to engage a workpiece to be tested, and said notch surface, said curved reflecting surface and said further surface being oriented and shaped in such a manner that the beam of acoustic energy produced by the transducer is brought to a focus at a location substantially at the area of engagement between said further surface and the workpiece.

2. A solid coupling means as set forth in claim 1, said further surface being provided with a longitudinal groove for receiving therein a tubular workpiece.

3. A solid coupling means as set forth in claim 1, said curved reflecting surface forming a part of a cylinder.

4. A solid coupling means as set forth in claim 1, said curved surface forming a portion of a sphere.

5. A solid coupling means as set forth in claim 1, said beam of acoustic energy provided at said notch surface and reaching said further surface traversing within said coupling means a folded path which includes an acute angle.

References Cited

UNITED STATES PATENTS

| | | | |
|---|---|---|---|
| 2,525,861 | 10/1950 | Carlin | 310—8.7 |
| 2,602,101 | 7/1952 | Mesh | 310—8.7 |
| 2,844,741 | 7/1958 | Murdoch | 310—8.5 |
| 2,649,550 | 8/1953 | Hardie | 310—8.7 |
| 2,927,284 | 3/1960 | Worrell | 310—8.7 |
| 2,984,756 | 5/1961 | Bradfield | 310—8.7 |
| 3,106,839 | 10/1963 | Sansom | 73—67.8 |
| 3,192,418 | 6/1965 | Sansom | 310—8.7 |

MILTON O. HIRSHFIELD, *Primary Examiner.*

J. D. MILLER, *Assistant Examiner.*